United States Patent

[11] 3,587,075

[72] Inventors Stanley F. Brown;
Steven J. MacArthur, both of San Jose, Calif.

[21] Appl. No. 792,454
[22] Filed Jan. 21, 1969
[45] Patented June 22, 1971
[73] Assignee Information Storage Systems, Inc.
Cupertino, Calif.

[54] CARRIAGE MECHANISM FOR DIRECT ACCESS DATA STORAGE DEVICE

5 Claims, 7 Drawing Figs.

[52] U.S. Cl. 340/174.1C
[51] Int. Cl. G11b 5/48, G11b 17/22, G11b 21/08
[50] Field of Search 340/174.1 C, 174.1 F; 179/100.2 CA, 100.2 C

[56] References Cited

UNITED STATES PATENTS

| | | | |
|---|---|---|---|
| 3,130,331 | 4/1964 | Jallen et al. | 340/174.1 |
| 3,175,204 | 3/1965 | MacDonald | 340/174.1 |
| 3,225,337 | 12/1965 | Jacoby | 340/174.1 |
| 3,314,057 | 4/1967 | Mogtader | 340/174.1 |
| 3,484,760 | 12/1969 | Perkins et al. | 340/174.1 |

*Primary Examiner*—Bernard Konick
*Assistant Examiner*—Vincent P. Canney
*Attorneys*—Robert B. Crouch and Gerald L. Moore

ABSTRACT: Apparatus for supporting an array of read/write heads for precise linear movement radially of a stack of rotatably recording discs, including a carriage for transmitting a drive force to the center of mass of the linear moving assembly, the carriage being supported on a three-point bearing assembly including a pair of right-angle roll assemblies bearing against a precision rail.

INVENTORS
STANLEY F. BROWN
STEVEN J. MACARTHUR
BY
ROBERT B. CROUCH

CARRIAGE MECHANISM FOR DIRECT ACCESS DATA STORAGE DEVICE

BACKGROUND

Direct access storage devices of the type that employ a stack of rotating discs as the storage media are well known in the data storage industry. In such devices, one or more discs are mounted for rotation about a precisely fixed axis in proximity with an access mechanism that includes an array of read/write heads, supporting mechanism and a linear motor. The access mechanism is mounted on an extension of a radius of the recording discs to facilitate movement of the read/write heads radially of the disc surfaces. In such a mechanism it is desirable to support the read/write heads in a manner that insures they will trace the identical path in each access movement, so that the heads may be positioned and then repositioned to the same spot with a high degree of accuracy. At the same time, it is desirable to keep the mass of the movable parts to a minimum to permit a maximum rate of acceleration, thus reducing the access time to a minimum. Requirements of repetition of motion of the read/write heads become particularly acute in data storage devices which employ disc drives with removable packs of discs. Since the disc packs are interchangeable between devices or drives, the access mechanism of each device must support the read/write heads for precise linear movement relative to the discs, so that data written on one device can be read and rewritten on another device without difficulty.

In prior known data storage devices, the requirement of linear movement of the read/write heads has been approached from the standpoint of rack and gear arrangements or planar bearing surfaces and contacting rollers. In these devices, separate precision rack and gear assemblies or machined bearing surfaces and associated rollers have been provided for each of the directions of potential movement. Thus, three individual assemblies have been utilized in an attempt to confine movement of the read/write heads to a linear path. In addition to the expense of manufacture and the complexity of assembly, the plurality of machined assemblies have each contributed weight to the access mechanism with consequent reduced accelerations achievable with a given driving force.

INVENTION

The present invention avoids the shortcomings of the prior art devices by provision of a single machined assembly for assuring precise linear movement of an array of read/write heads. In this invention, a receiver assembly is mounted on a carriage which is guided and supported for linear movement by means of a three-point bearing assembly including one or more right-angle roll assemblies. The roll assemblies ride on an elongated precision rail which is accurately positioned between the disc stack and a linear drive motor. The roll assemblies track the rail with a high degree of accuracy and insure precise linear movement of the carriage. The carriage is maintained in a single plane by means of a roller riding on a planar bearing surface spaced laterally from the rail. The rail, the bearing surface and the receiver assembly are positioned relative to the linear motor such that the drive force applied to the carriage acts through the center of mass of the entire movable assembly.

Objects and many of the attendant advantages of this invention will be readily understood by reference to the following detailed description of embodiments of the invention as illustrated in the accompanying drawings wherein.

Figure 1:
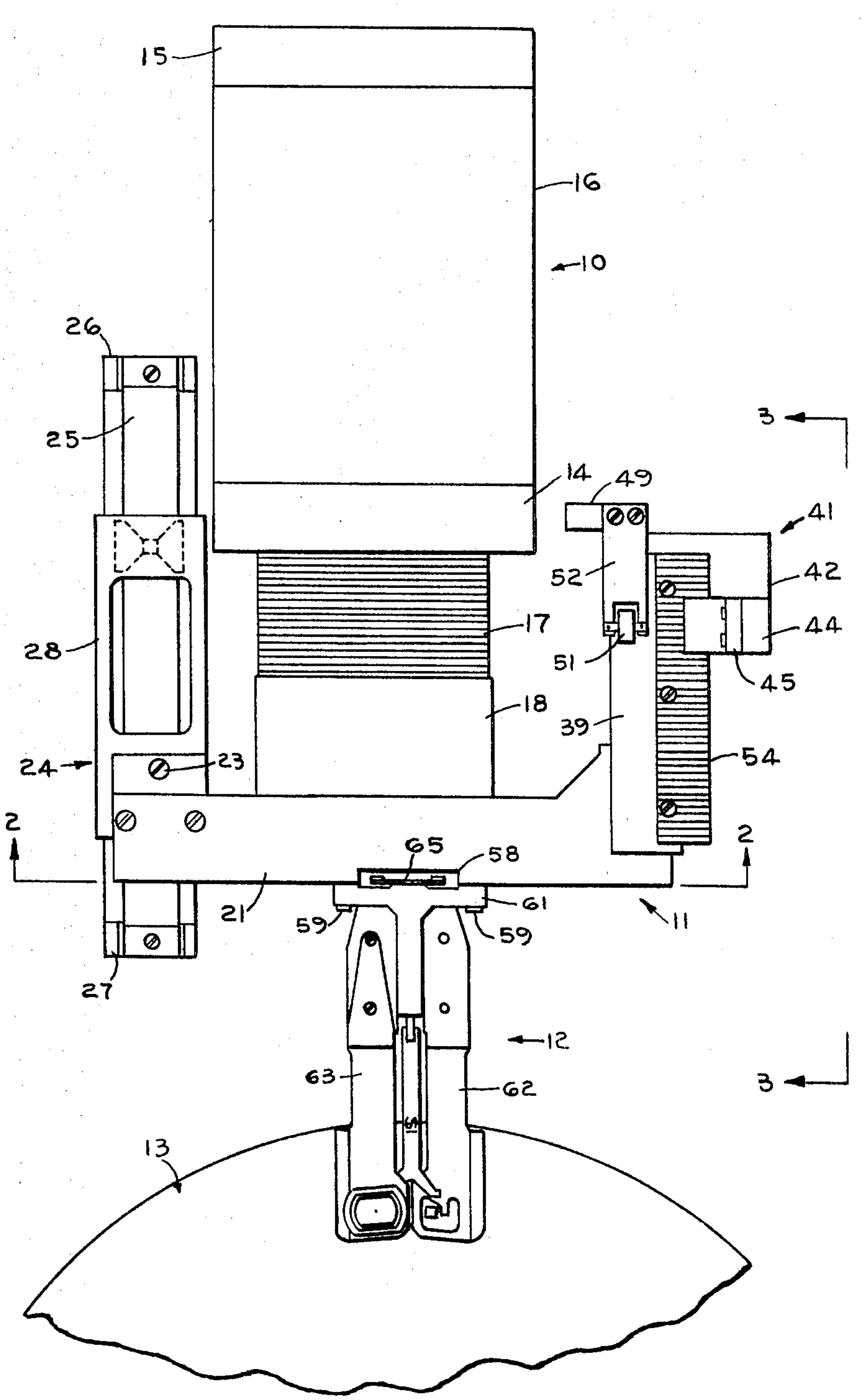
FIG. 1 is a plan view of an access mechanism according to the present invention.

Referring more particularly to FIG. 1, the access mechanism of the present invention is adapted to be mounted on a baseplate (not shown) and is illustrated as including a movable-coil linear motor 10, a carriage assembly 11 and a receiver assembly 12 positioned for accessing an array of read/write heads to a stack of recording discs shown at 13. As illustrated, the movable-coil motor includes front and rear pole pieces 14 and 15, respectively, secured to an upper permanent magnet 16 and a similar lower magnet (not shown). A coil 17 of conductive wire (copper, aluminum, etc.) is wound on a nonconductive, cylindrical coil form 18 which extends through an opening (not shown) in the front pole piece 14 into the space between the upper and lower permanent magnets. An annular end cap 19 (FIG. 2) of aluminum, or similar conductive material, is secured to the end of the coil form by means of a cylindrical flange extending from the cap into the coil form and into proximity with the coil. The carriage assembly 11 includes an adapter 21 in the form of an elongated beam which is secured at its approximate midlength to the annular end cap 19, such as by screws 22. The opposite ends of the adapter act as cantilever beams. The placement of the screws 22 adjacent the horizontal axis of the end cap limits the unsupported lengths of the opposite ends of the adapter and the consequent deflection of the ends. The adapter is secured at one end by screws 23 to a cart 24 which is mounted on a precision cylindrical rail 25. The rail is in turn supported on the base plate by means of mounting brackets 26 and 27. The rail is formed from a precision-ground rod and is mounted adjacent to, and in overlapping relation with, the motor as shown. The rail is aligned in precise parallelism with the desired path of movement of the head array, which is along an extension of a radius of the recording discs. The cart 24 is a boxlike structure which includes an inverted channel member having a planar web section 28 and spaced side sections 29 and 31 depending from opposite longitudinal edges of the web. A bottom cap section 32 is secured to the distal extremities of the side sections as by screws 33. A right-angle roll assembly in the form of a V-roll 34 is mounted in the interior of the channel member adjacent the connection with the adapter and is supported by a pair of oppositely extending stub shafts 35 and 36 which are journaled in bearings (not shown) received in the side sections 29 and 31 respectively. A similar V-roll, shown in dotted line in FIG. 1 is mounted in a similar manner at the opposite end of the channel member. A roller 37 is mounted on a leaf spring 38 which is secured to the exterior of the cap section in any suitable manner. The roller extends through an opening in the cap section into engagement with the lower surface of the rail 25 opposite the V-roll 34. A similar roller is provided in association with the V-roll at the opposite end of the cart.

An elongated rectangular arm member 39 having planar upper and lower surfaces is secured to the end of the adapter 21 removed from the cart 24. The member 39 is mounted parallel to the cart 24 and extends toward the motor into proximity with a transducer support assembly 41. The support assembly includes a generally rectangular post 42 which is secured at one end to the base plate. The upper surface 43 of the post is generally flat except for a vertically extending projection 44. A pair of oppositely-facing brackets 45 and 46 are aligned in spaced relation on the surface of the projection 44 toward the motor. The bracket 45 supports a light source 47 facing one or more sensors 48 mounted in bracket 46. A U-shaped bracket 49 is secured to the post and extends toward the motor and above the surface 43 to support a roller 51 at the end of a cantilever leaf spring 52. A roller bearing 53 is mounted on the post adjacent surface 43 and in alignment with roller 51. The rectangular member 39 is positioned between the roller 51 and roller bearing 53 and supports an elongated optical mask 54 which extends between the light source 47 and sensor 48. Member 39 rides on the roller bearing 53 while roller 51 bears against the upper surface of the member. The mask 54 is mounted on the upper surface of member 39 and protrudes from one longitudinal edge thereof into the space between brackets 45 and 46.

Figure 2:
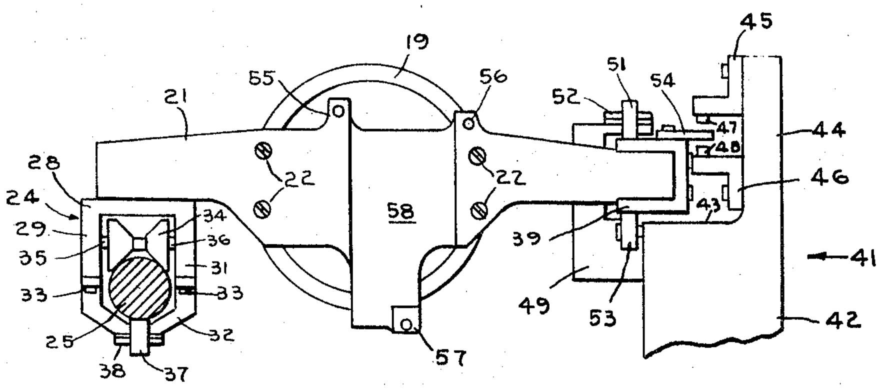
FIG. 2 is an elevation view partly in section taken along line 2–2 of FIG. 1.

As shown in FIG. 2, the adapter includes a wide central section having three mounting pads 55, 56 and 57, the surfaces of which are in a common vertical plane. A recess 58 is formed in the adapter between pads 55 and 56 and above pad 57. The receiver assembly 12 includes a T-block 61 on which are mounted five pairs of head-arm assemblies 62, 63, a torque rod 64 associated with each pair of head-arm assemblies and linkage 65 for actuating the linkage. This assembly is of the type shown in copending application No. 763,595 of S. F. Brown and S. J. MacArthur now U.S. Pat. No. 3,531,788 issued Sept. 29, 1970. The receiver assembly is positioned on the adapter with the linkage 65 received within the recess 58 and is secured in position by means of screws 59 threaded through the T-block and into the mounting pads.

Figure 4:
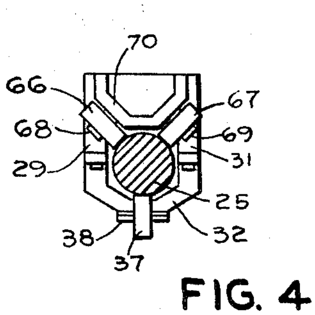
FIG. 4 is an elevation view partly in section of an alternative type of right-angle roll assembly.

Referring to FIG. 4, an alternative form of right-angle roll assembly is illustrated in connection with the cart 24. The arrangement of FIG. 4 is similar to that shown in FIG. 2 except for the roll assembly which includes a central V-shaped member 70 formed integrally with the inverted channel member and two rollers 66 and 67 mounted on stub shafts 68 and 69 respectively. The stub shafts are arranged at right angles to each other with their adjacent ends received in openings in the member 70. The rollers 66 and 67 bear against the rail 25 and are loaded in this position by roller 37 and leaf spring 38.

Figures 5, 6:
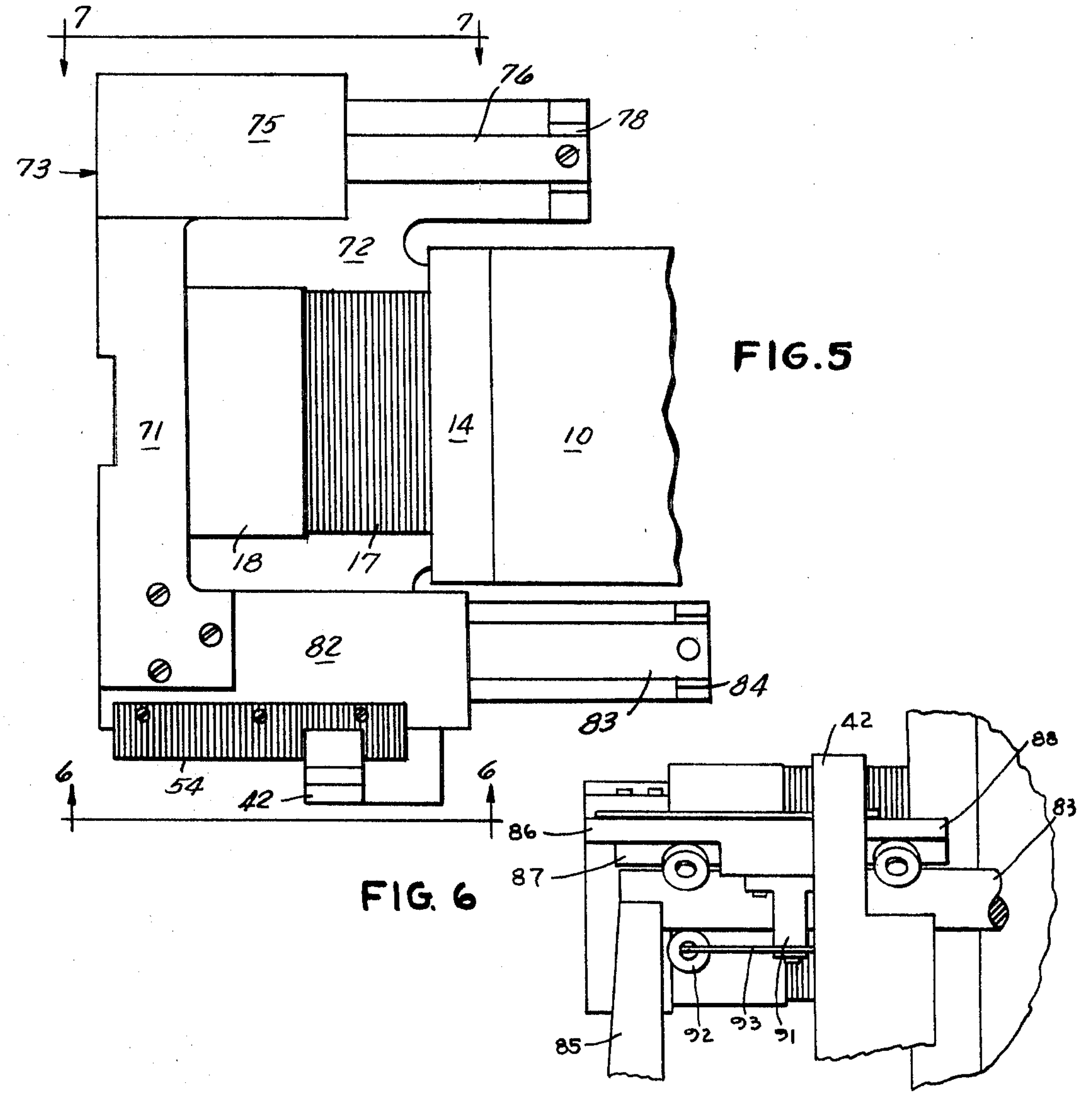
FIG. 5 is plan view of an alternative embodiment of the present invention.
FIG. 6 is an elevation view taken along line 6–6 of FIG. 5.
Figure 7:
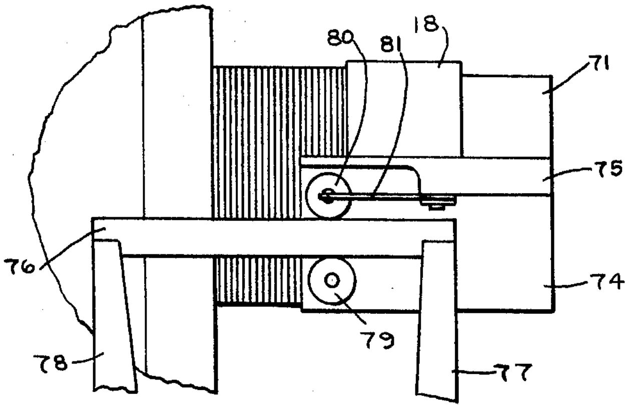
FIG. 7 is an elevation view taken along line 7–7 of FIG. 5.

An alternative carriage arrangement is illustrated in FIGS. 5—7. In this embodiment an adapter 71 is connected to the coil form 18 of the motor 10 and is supported above a baseplate 72 for movement with the coil 17. An arm member 73 is formed on, or secured to, one end of the adapter 71 and extends parallel with the coil form. Referring to FIG. 7, the arm member is an inverted L-shaped member with a vertically extending section 74 and a horizontally extending section 75. A horizontal beam 76 having planar upper and lower surfaces is mounted on spaced brackets 77 and 78 which protrude from the upper surface of the baseplate 72. A roller bearing 79 is mounted on section 74 of the arm member and bears against the lower surface of the beam. A roller 80 is supported on a leaf spring 81 which is secured to the lower surface of section 75 of the arm member. Roller 80 is vertically aligned with the roller bearing and bears against the upper surface of the beam. A cart 82 is secured to the end of the adapter removed from the arm member and extends parallel with the coil form between the front pole piece of the motor and the post 42. An optical mask 54 is mounted on the upper surface of the cart and extends into proximity with a light source and sensors mounted on post 42 similarly to the embodiment of FIG. 1. A precision rail 83 extends parallel to the longitudinal axis of the motor and is mounted on spaced brackets 84 and 85 which protrude from the upper surface of the baseplate. The cart includes a planar platform section 86 which supports the optical mask. The lower surface of the platform is recessed adjacent each end to form V-shaped sections 87 and 88. A pair of right angle roll assemblies 89 and 90 are mounted on the V-sections in a manner similar to that of FIG. 4. A bottom cap 91 is connected to the platform between the V-sections and extends below the rail 83. A roller 92 is mounted on a leaf spring 93 which is connected to the cap 91. Right angle roll assemblies 89 and 90 bear against the upper surface of the rail 83 while roller 92 and another roller, blocked from view by post 42, bear against the lower surface of the rail. The carriage construction of FIG. 5 differs from that of FIG. 1 in the location of the optical mask on the cart and the mounting of the roller bearing on the carriage instead of on the support member, i.e., post 42.

OPERATION

Figure 3:
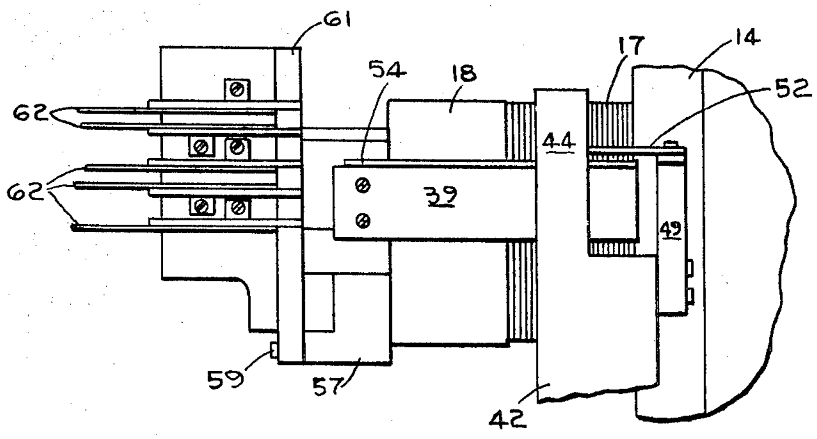
FIG. 3 is an elevation view of the access mechanism taken along line 3–3 of FIG. 1.

The carriage assembly is supported by a three-point bearing consisting of the right-angle roll assemblies mounted in the cart, one at each end, and either the roller bearing 53 or the roller bearing 79. The roll assemblies riding on the precision rail 25 or 83 guide the carriage in a linear path with a high degree of accuracy, limited only by the concentricity of the rollers and the linearity of the rail. The carriage is loaded against the three-point bearing by the leaf springs and rollers bearing against the lower surface of the precision rail and by the leaf spring and roller bearing against the upper surface of either the rectangular arm member 39 or the arm member 76. This preloading of the carriage maintains the receiver assembly in a single plane during all positions of the actuating mechanism. To provide motive force for the carriage and the receiver assembly and position the magnetic read/write heads at desired track positions on the discs 13, current is supplied to the coils through leads (not shown). When current is applied in one direction, the coil moves out of the motor at a rate proportional to the amount of current. Reversal of the current causes the coil to be retracted within the motor until the end cap is received in the front pole piece. The end cap, which is made of conductive material, acts as a shorted turn on the coil, thus forming an eddy current brake to decelerate the movement of the coil and prevent damage from contact between the adapter and the front pole piece. Positioning information regarding the instantaneous location of the read/write heads is obtained from the mask 54 in cooperation with the light source and sensor. The mask is an elongated strip of translucent material which is inscribed with closely spaced, parallel lines creating alternate opaque and translucent areas. As the mask is moved between the light source and sensor, the light is alternately blocked and transmitted to create an output from the sensor each time a line on the mask traverses the sensor. The lines on the mask correspond to the track positions on the disc so that the position of the read/write heads may be determined directly from the position of the mask. The mask, as shown in FIGS. 3 and 6, is supported in the same horizontal plane as the middle pair of head-arm assemblies, i.e., the mean head position in the head array. Therefore, mechanical errors induced by head-to-disc tolerances are averaged. When the head-arm assemblies are mounted on the T-block, the position of each assembly is adjusted to align the associated read/write head with a given track on the disc stack. Errors in alignment tend to be cumulative from the top to the bottom of the array. Therefore, by selection of the mean head position as the reference for positioning the entire array, the mechanical errors are averaged and the entire array positioned from track to track with the maximum degree of accuracy.

As shown in FIGS. 1 and 2, the T-block is mounted on the adapter such that it is slightly to one side and a little below the central axis of the coil. The purpose of this is to balance the combined weight of the carriage assembly and the receiver assembly, so that the motor drive force is applied to the dynamic center of mass of the entire moving assembly. The location of the cart 24 and the rectangular member 39, or the cart 82 and the arm member 73, at the opposite extremities of the adapter allows the carriage to telescope over the end of the motor as the coil is retracted. The fact that the cart 24 or 82 and member 39 or 73 extend from the rear surface of the adapter toward the motor leaves the opposite surface of the adapter open. This allows easy access to the receiver assembly to mount and adjust the head-arm assemblies and also provides room in which to locate the leads for the read/write heads.

Obviously, many modifications and variations of the present invention are possible in the light of the above teachings. It is therefore to be understood that within the scope of the appended claims, the invention may be practiced otherwise than as specifically described.

What we claim is:

1. In a direct access data storage device including one or more data storage discs mounted for rotation about a common axis, an array of read/write heads and an actuator, apparatus for supporting the array and translating motion of the actuator into precise linear movement of the read/write heads along an extension of a diameter of the discs, including:
a precision rail positioned at one side of and in overlapping relation with the actuator and extending parallel to the extension of a diameter of the discs;
a support member adjacent the actuator and spaced from the rail;
a carriage including an elongated adapter and two spaced arm members protruding therefrom, the first arm member being positioned on the rail and the second arm member being supported by the support member through a roller bearing mounted in alignment with and spaced from the extension of the disc diameter, the first arm member guiding the carriage in a precise linear path axially of the rail and along the extension of the disc diameter with low, uniform frictional resistance.

2. Apparatus as defined in claim 1 wherein:
the transducer includes fixed and movable elements, the fixed elements being mounted adjacent the actuator and the movable element being mounted on the carriage for horizontal movement in approximately the plane of the mean head position of the array.

3. Apparatus as defined in claim 2 wherein:
the carriage is a generally U-shaped member formed by the first arm member, the adapter and the second arm member; and
the first arm member is an elongated structure in which are mounted two right-angle roll assemblies which are spaced apart and which are spring loaded against the rail.

4. Apparatus as defined in claim 3 wherein:
the second arm member is an elongated structure having planar upper and lower surfaces, the lower surface being spring loaded against a roller bearing on the support member and the upper surface supporting the movable element of the position transducer.

5. Apparatus as defined in claim 3 wherein:
the second arm member is an elongated structure supporting a roller bearing at a point removed from the adapter, the roller bearing being spring loaded against a bearing surface on the support member.